(12) United States Patent
Dendy et al.

(10) Patent No.: US 12,065,094 B2
(45) Date of Patent: Aug. 20, 2024

(54) OBJECT-SENSING BUMPER EXTENSION

(71) Applicant: Hyster—Yale Group, Inc., Fairview, OR (US)

(72) Inventors: Tanner Reese Dendy, Greenville, NC (US); Matthew Hoffman, Greenville, NC (US); Justin Lancaster, Pikeville, NC (US)

(73) Assignee: Hyster—Yale Materials Handling, Inc., Fairview, OR (US)

( * ) Notice: Subject to any disclaimer, the term of this patent is extended or adjusted under 35 U.S.C. 154(b) by 332 days.

(21) Appl. No.: 17/581,112

(22) Filed: Jan. 21, 2022

(65) Prior Publication Data

US 2023/0234525 A1 Jul. 27, 2023

(51) Int. Cl.
*B60R 19/48* (2006.01)
*B60R 19/03* (2006.01)
*B60R 19/44* (2006.01)
*B60W 30/09* (2012.01)

(52) U.S. Cl.
CPC ............ *B60R 19/483* (2013.01); *B60R 19/03* (2013.01); *B60R 19/44* (2013.01); *B60W 30/09* (2013.01); *B60W 2300/121* (2013.01); *B60W 2420/403* (2013.01); *B60W 2720/10* (2013.01)

(58) Field of Classification Search
CPC ....... B60R 19/483; B60R 19/03; B60R 19/44; B60W 30/09; B60W 2300/121; B60W 2420/42; B60W 2720/10
See application file for complete search history.

(56) References Cited

U.S. PATENT DOCUMENTS

| | | | |
|---|---|---|---|
| 5,465,807 A | 11/1995 | Josephs | |
| 5,751,124 A | 5/1998 | Josephs | |
| 6,513,843 B1* | 2/2003 | Frederick | B60R 19/18 293/120 |
| 10,340,095 B2 | 7/2019 | Haake et al. | |
| 2008/0237002 A1 | 10/2008 | Zhang | |
| 2010/0114405 A1* | 5/2010 | Elston | B60W 30/09 701/1 |
| 2017/0080886 A1* | 3/2017 | Kuga | G01S 17/931 |

(Continued)

FOREIGN PATENT DOCUMENTS

| | | |
|---|---|---|
| DE | 102006051698 | 12/2007 |
| DE | 102014002608 A1 | 8/2015 |
| EP | 2392506 B1 | 5/2013 |

*Primary Examiner* — Jaime Figueroa
*Assistant Examiner* — Mohamad O El Sayah (57) ABSTRACT

An object-sensing bumper extension comprises a durable and flexible material. The bumper extension is connected to the bumper of a vehicle such as a lift truck to detect encroachment and/or impact between the vehicle and an operator or other object. A non-contact sensor detects encroachment of an object within an impact danger zone arranged immediately in front of and near the sides of the vehicle. An impact sensor detects impact between the vehicle and an object. A control system receives sensor signals and initiates a reaction operation of the vehicle in response to sensor activity. The reaction operation can include slowing the vehicle down, stopping the vehicle, and/or reversing the vehicle. The bumper extension can include a plurality of outwardly angled, substantially parallel ridges that deform outwardly and downwardly to push an impacted object away from danger and to fill a gap between the vehicle and the ground.

20 Claims, 9 Drawing Sheets

(56) References Cited

U.S. PATENT DOCUMENTS

| | | | |
|---|---|---|---|
| 2018/0029550 A1* | 2/2018 | Campbell | B60R 19/34 |
| 2019/0054876 A1* | 2/2019 | Ferguson | G06Q 30/0645 |
| 2020/0122662 A1* | 4/2020 | Farooq | B60R 19/18 |
| 2020/0283019 A1* | 9/2020 | van Kampen | G05D 1/0223 |
| 2020/0377048 A1* | 12/2020 | Umezawa | B60R 21/34 |
| 2022/0105888 A1* | 4/2022 | Crinklaw | B60R 19/483 |
| 2023/0166681 A1* | 6/2023 | Worden | B60R 19/42 |
| | | | 293/102 |

* cited by examiner

OBJECT-SENSING BUMPER EXTENSION

TECHNICAL FIELD

This disclosure relates generally to components and methods for sensing and responding to objects in front (opposite the forks) of a lift truck and to foot guards for protecting the feet of a truck operator.

BACKGROUND INFORMATION

Figure 1A:
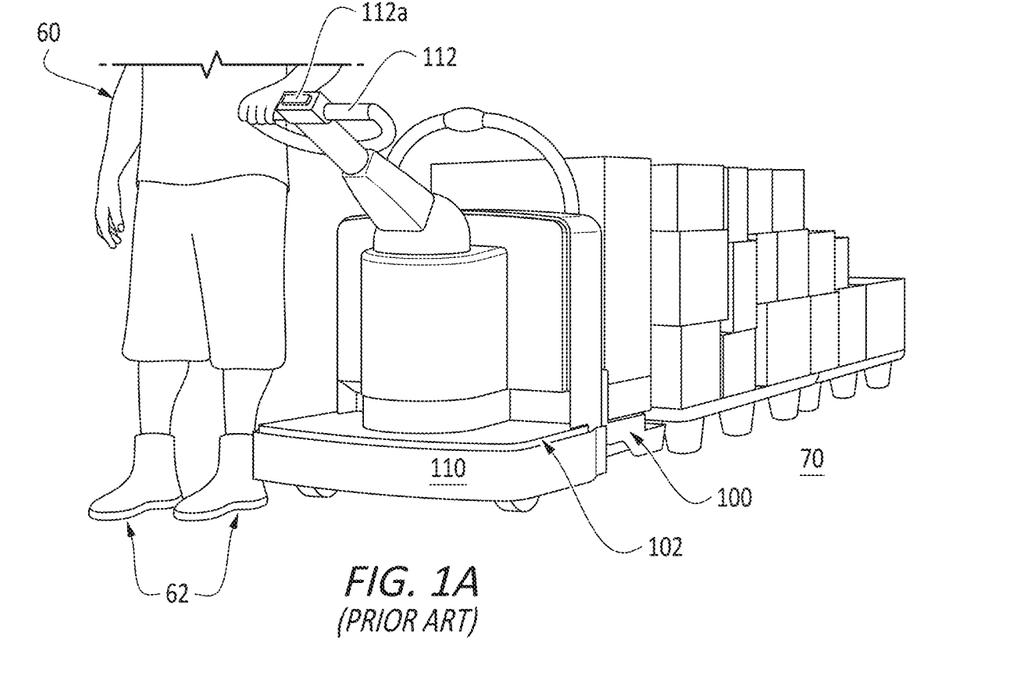
FIG. 1A is an isometric drawing illustrating operation of a conventional lift truck in a "walk along" or "cruise control" mode.

Referring to FIG. 1A, a conventional lift truck (or end rider pallet jack) 100 may permit a "cruise control" or "walk along" mode that allows an operator 60 to use a handle 112 to control the lift truck 100 while walking along a warehouse floor 70. This mode is useful, for instance, for low-level order-picking applications where efficiency requires close approaches in front of the truck 100 while it is moving. Conventional lift trucks 100 typically include a front bumper 110 to limit or prevent damage from impacts between the lift truck and other objects. Unfortunately, because the operator 60 is required to walk in close proximity to the lift truck 100, the operator's feet 62 may be at risk of being impacted, overrun, and/or pinned by the lift truck 100. In particular, the operator's feet 62 may be overrun by the truck 100 and become caught or trapped in an area between the bumper 110 and the warehouse floor 70. In case of such events, or other emergencies, the lift truck 100 may include a belly switch 112a on the handle 112 that can be pushed in an emergency to stop the truck 110.

Figure 1B:
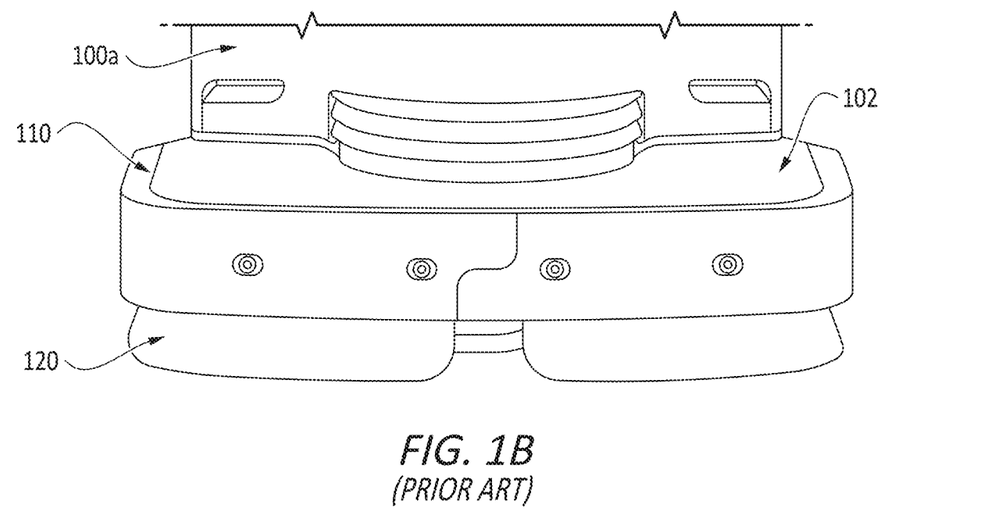
FIG. 1B is an isometric drawing of a conventional lift truck having a passive foot guard according to the prior art.

Referring additionally to FIG. 1B, to reduce the risk of operator injury, foot guards 120 may be included as part of the front bumper 110 or as an addition to the front bumper 110 to protect the feet 62 of a truck operator 60 from being overrun or pinched by the truck 100A during low-level order-picking operations performed in the walk along mode. A lift truck 100A may, for instance, include a foot guard 120 attached to the front bumper 110 to provide a passive alert to the operator 60 that their foot 62 is in a danger area. The foot guard 120 may also serve to push against the foot 62 of the operator 60 and further occupy an area under the lift truck 100A to prevent the foot 62 from being overrun and pinned. Additional related art may provide other features to reduce risk of operator injury and improve truck operation. For example, conventional bumpers may employ contact sensors where activation of the contact sensors can trigger truck braking.

Unfortunately, conventional foot guards and bumper sensors are not sufficiently robust and may be substantially deteriorated by day-to-day impacts with debris on the warehouse floor. Conventional solutions also do not adequately prevent operator injury, and fail to provide an optimal system for protecting the operator and preventing unwanted contact.

OVERVIEW OF DISCLOSURE

The principles and concepts described herein provide an object-sensing bumper extension that utilizes both contact and non-contact (e.g., optical) sensors to identify operator interference or other obstructions and prevent operator injury or damage to the truck or other objects.

More particularly, one or more optical sensors can be provided and arranged to provide a field of view of a potential impact zone for an operator's feet. The sensors are preferably placed and configured to only survey the areas directly in front of the bumper that if impeded could likely result in improper contact with an operator. In other words, the optical sensors can be provided with a specific and limited field of view to prevent undesired triggering of the system in situations where a potential impact with an operator is not likely, while enabling reliable triggering of the system in appropriate situations where operator impacts may be in question. When an object is detected in the potential impact zone, a reaction operation of the truck can be initiated. By implementing an optical danger detection zone, the principles of the present inventive concepts can further reduce or eliminate truck impacts with an operator's feet resulting from missteps and instead turn recordable impacts into near misses.

In addition, one or more contact sensors can be provided that respond to deformation of the object-sensing bumper extension. The contact sensors can detect deformation of the bumper extension and trigger a reaction operation of the lift truck in response.

The improvements of the present inventive concepts can, for instance, be provided to existing lift trucks through an easy to implement bolt-on system that does not impede normal, efficient picking operations.

In one embodiment, the bumper extension preferably comprises a flexible but durable material (Shore 60A rubber or plastic, for instance) that deforms in response to contact. The bumper extension can, for instance, be injection molded with metallic features for providing contact (deformation) sensors. The bumper extension can further be configured with an outwardly angled, substantially parallel fin or ridge configuration that not only permits deformation of the bumper extension but further provides an outwardly directed force, for example, outward towards the side of a vehicle, on the impacted object to help push it out of the way and prevent it from being pinched or trapped under the truck. Furthermore, the deformed material can further fill a gap or spacing between the truck and the ground to help prevent an operator's foot (or other body part or obstruction) from entering that area and becoming pinched or trapped under the truck.

In one embodiment, an object-sensing bumper extension comprises a deformable material configured to be attached to and extend from a front bumper of a lift truck. One or more optical sensors are provided to detect encroachment into a potential impact zone immediately in front of the bumper extension in areas where contact with an operator is likely. A control system is provided to send a signal to the truck that initiates a reaction operation of the truck in response to object detection by the optical sensor(s). One or more contact sensors are also provided to detect bumper extension deformation as a result of physical impact with an operator or other obstacle. The control system is further configured to send a signal to the truck that initiates a reaction operation of the truck in response to impact detection by the contact sensor(s). Depending on the sensor input, the reaction operation of the truck can include, for instance, regenerative braking (i.e., "regen" that can include slowing down and/or stopping the truck), and/or reversing direction. The reaction operation can continue for as long as sensor input remains active.

In one embodiment, an object-sensing bumper extension comprises a deformable bumper extension configured to extend outwardly from a vehicle bumper. An optical sensor is provided to detect objects immediately in front of the bumper extension in a predetermined impact danger area. A contact sensor is also provided to detect deformation of the bumper extension as a result of impact with an operator or other object. The optical sensor provides an impact warning signal to a control system in response to object detection in the impact danger area. The contact sensor provides an impact detection signal to the control system in response to impact detection. The control system initiates an appropriate reaction operation of the vehicle in response to the impact warning and impact detection signals.

In some additional, alternative, or selectively cumulative embodiments, the reaction operation includes a regenerative braking operation ("regen").

In some additional, alternative, or selectively cumulative embodiments, the reaction operation includes reversing a direction of travel of the vehicle.

In some additional, alternative, or selectively cumulative embodiments, the reaction operation continues until the impact warning and impact detection signals are both inactive.

In some additional, alternative, or selectively cumulative embodiments, the object-sensing bumper extension comprises a bumper extension formed from a durable and flexible material, such as Shore 60A rubber or plastic.

In another embodiment, an object-sensing bumper extension comprises a bumper extension formed from a durable and flexible material, such as natural or synthetic rubber, polymers, or other suitable materials. The bumper extension comprises a plurality of outwardly angled, substantially parallel ridges configured to deform as a result of impact with an operator or other object. The outward angle can, for instance, be an approximately 30-45 degree angle with respect to a longitudinal axis of a vehicle, or another desired angle. The bumper extension can be formed through injection molding and include a plurality of electrically conductive features, for example, made of metal, that can operate as impact sensors. An opening can be formed in an upper portion of the bumper extension to receive an optical sensor. The optical sensor can be configured to survey an area directly in front of the bumper extension near a side of a protected vehicle. A control system can be provided to receive signals from the sensors and initiate a reaction operation of the protected vehicle in response to sensor activity.

In some additional, alternative, or selectively cumulative embodiments, the area surveyed by the optical sensor is an area of likely potential impact with an operator's feet.

In some additional, alternative, or selectively cumulative embodiments, the reaction operation comprises one or more of the following operations: Slowing down the vehicle, stopping the vehicle, and reversing the direction of vehicle travel.

In some additional, alternative, or selectively cumulative embodiments, the bumper extension is configured to exert an outward force on an impacted object to help prevent it from being pinned below the vehicle.

In some additional, alternative, or selectively cumulative embodiments, the bumper extension is configured to further fill an area below the vehicle when it is deformed to prevent an impacted operator body part or object from entering an area below the vehicle.

In other embodiments, additional sensors may be included and the reaction operation can be modified based on the information from the other sensors. Load or weight sensors can be included, for example, and the reaction operation can take the detected weight or load into consideration when determining how fast to slow down, stop, and/or reverse truck direction.

Various aspects, embodiments, and configurations of the principles and concepts described herein are possible without departing from the principles disclosed herein. The inventive concepts are therefore not limited to any of the particular aspects, embodiments, or configurations shown or described herein. In addition, various features, benefits, and configurations incorporating the principles and concepts described and illustrated herein will be readily apparent to those of ordinary skill in the art based on this disclosure and all such features, benefits and configurations are considered within the scope of the present invention.

Among other things, it should be apparent that various different materials could be used for the bumper extension, and the bumper extension could be used on vehicles and other moving devices besides lift trucks. Furthermore, the object-sensing bumper extension can be configured as a retrofit or original equipment for a lift truck or other device.

Additional aspects and advantages will be apparent from the following detailed description of example embodiments, which proceeds with reference to the accompanying drawings.

BRIEF DESCRIPTION OF THE DRAWINGS

The foregoing and additional objects, features, and advantages of the present inventive concepts will become more readily apparent from the following detailed description of preferred embodiments, depicted in the attached drawings, in which.

DETAILED DESCRIPTION OF EMBODIMENTS

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the exemplary term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Figure 2:
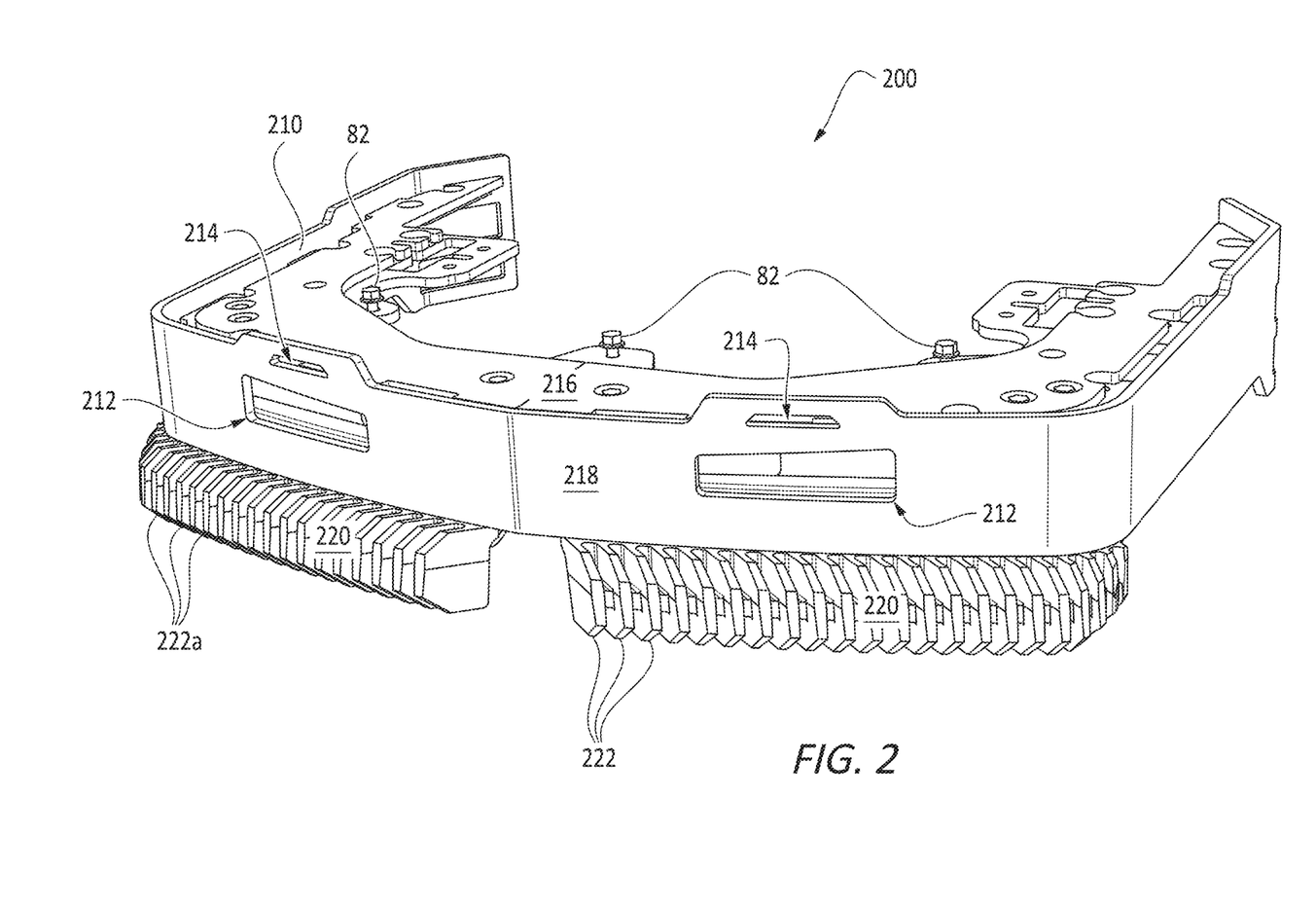
FIG. 2 is an isometric drawing illustrating an object-sensing bumper extension configured to retrofit an existing lift truck or be provided as part of a new lift truck according to principles of the present inventive concepts.

Referring to FIGS. 1A and 2, an object-sensing bumper extension 200 can be configured as a retrofit for existing vehicles 100 (or included as original equipment on new vehicles). The bumper extension 200 can include a desired connection mechanism (such as bolts 82) for connecting it to the bumper 110 of an existing vehicle 100. Electronic cables can be provided that connect the control system 800 (see FIG. 8) of the object-sensing bumper extension 200 into the existing electronic inputs of the vehicle 100. For vehicles that utilize a different communications system, converters can be provided to convert the electronic signals into the appropriate communications protocols (i.e., serial communication).

Figure 5:
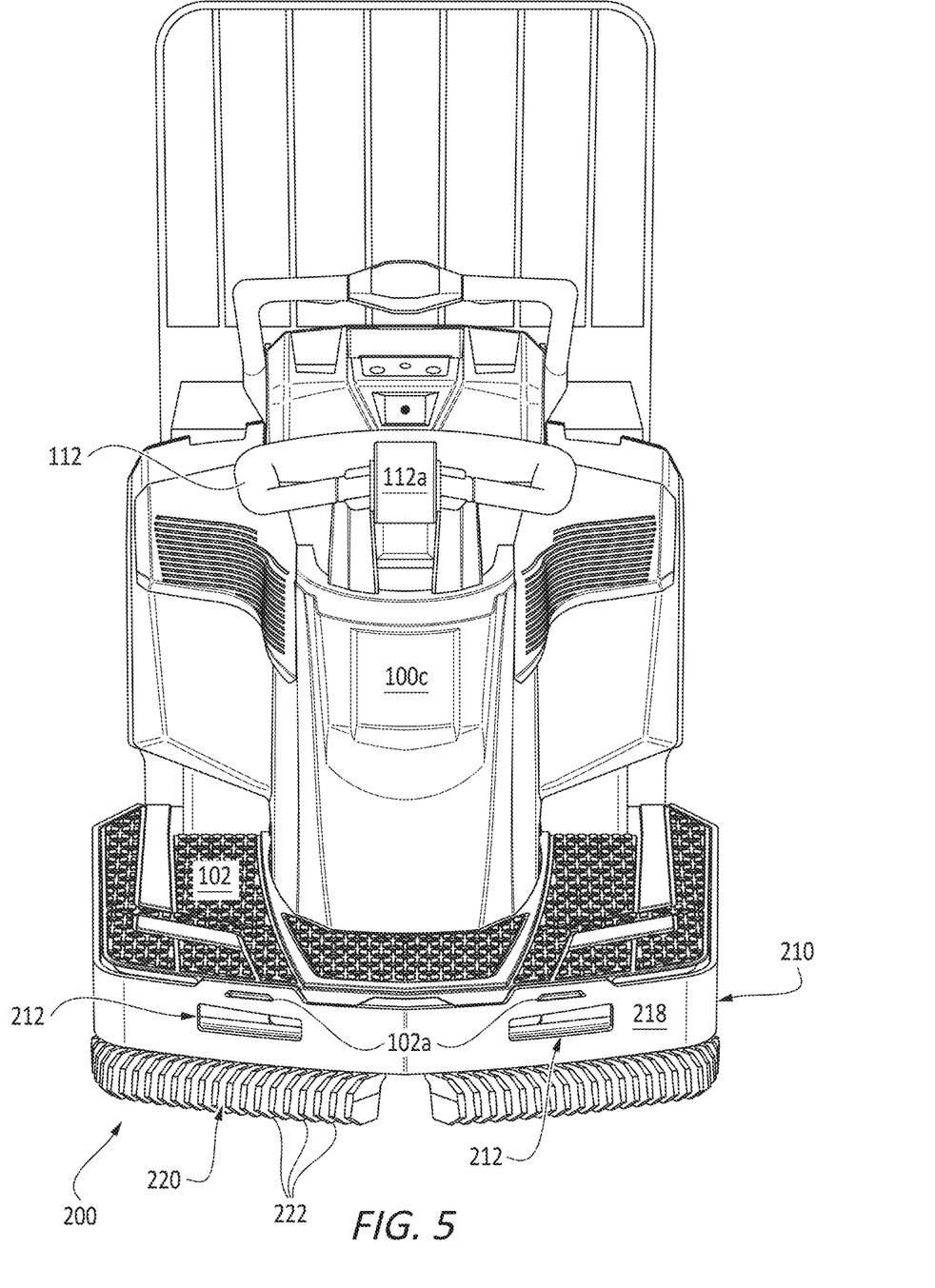
FIG. 5 is an isometric rear view of an object-sensing bumper extension arranged on a lift truck according to further principles of the present inventive concepts.

More specifically, an object-sensing bumper extension 200 can be provided that can either be retrofit to an existing lift truck 100 or included as original equipment with a new lift truck 100C (see FIG. 5). The object-sensing bumper extension 200 according to this embodiment preferably comprises a body 210 formed of a durable, yet flexible, material. The material may, for instance, be Shore 60A rubber or plastic.

The body can include a substantially horizontal base 216 that can be connected to a bumper 110 of the lift truck 100, 100C through a desirable connection mechanism such as bolts 82. A bumper extension member 218 can extend substantially vertically from the base 216 around a front and sides of the base 216. One or more openings 212 can be configured through the bumper extension member 218 to house one or more optical sensors (not shown). A foot guard (or pad) 220 can include a plurality of outwardly angled fins or ridges 222 that extend downward and outward from the extension member 218 and provide contact surfaces 222a on their outermost surfaces for impacting an operator 60 or other objects. The bumper extension 200 can, for instance, be injection molded and include a plurality of electrically conductive contact surfaces or features, such as metallic contacts (not shown) that can be used as impact or deformation sensors (not shown).

Figure 3:
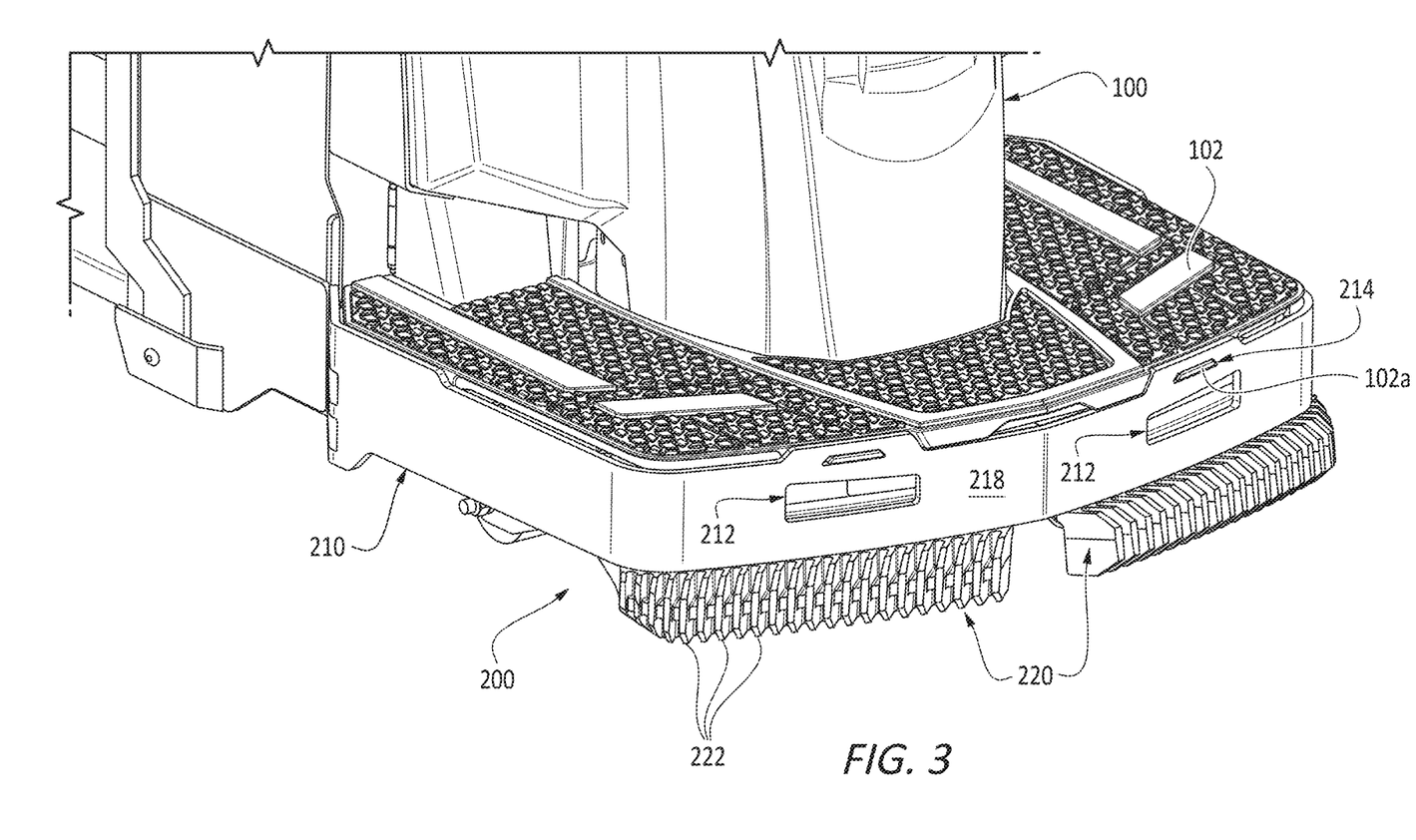
FIG. 3 is an isometric drawing illustrating a lift truck equipped with an object-sensing bumper extension according to further principles of the present inventive concepts.
Figure 4:
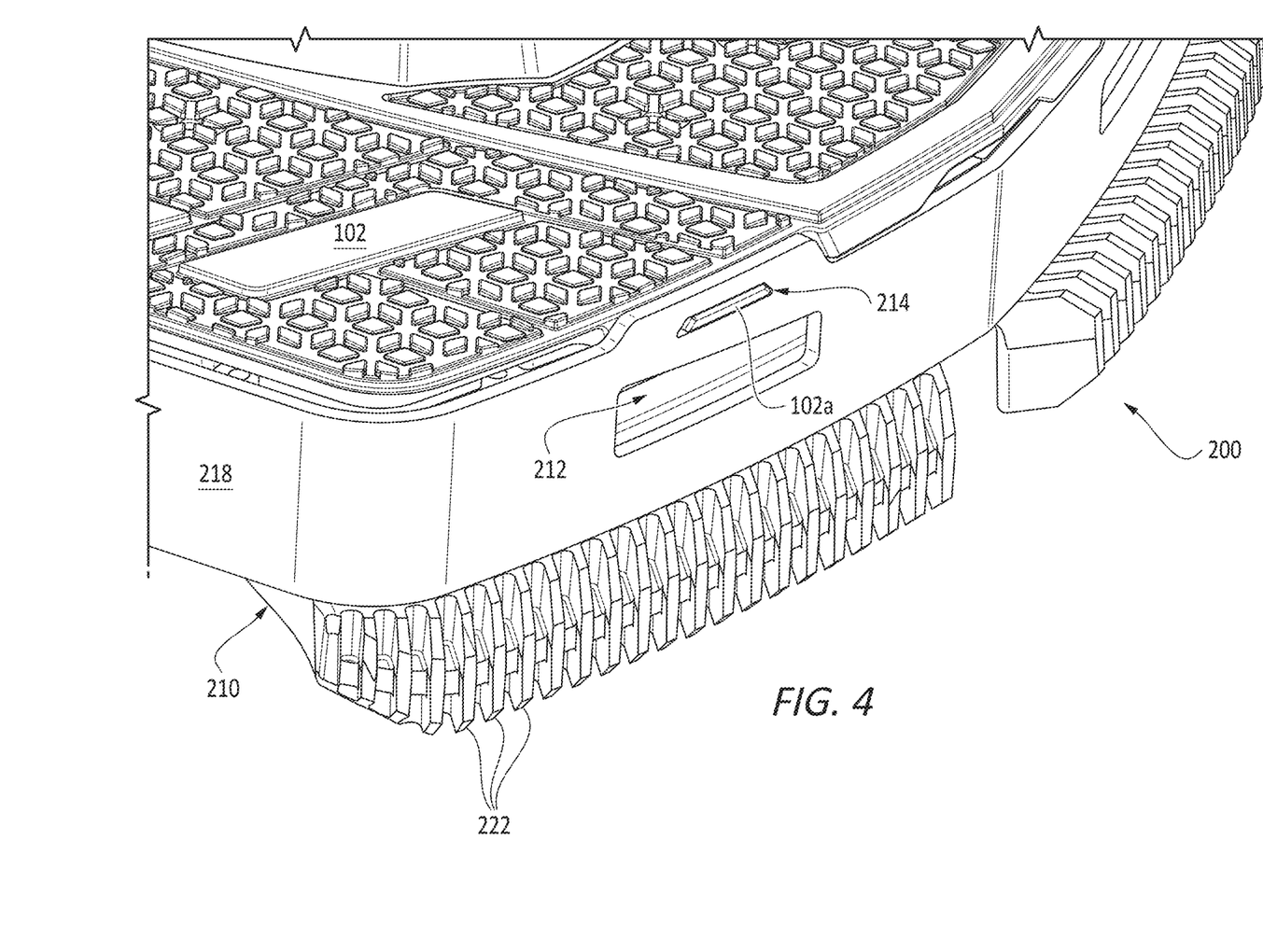
FIG. 4 is an isometric close up view illustrating an object-sensing bumper extension connected to a lift truck according to still further principles of the present inventive concepts.

Referring additionally to FIGS. 3-5, the object-sensing bumper extension 200 can be retrofit to an existing truck 100 or included as original equipment on a new truck 100C. Bolts 82 can secure the body 210 to the bumper 110 of the truck 100, 100C, and detents 214 in the extension member 218 can receive tabs 102a from a foot plate 102 of the truck 100, 100C.

Figure 6:
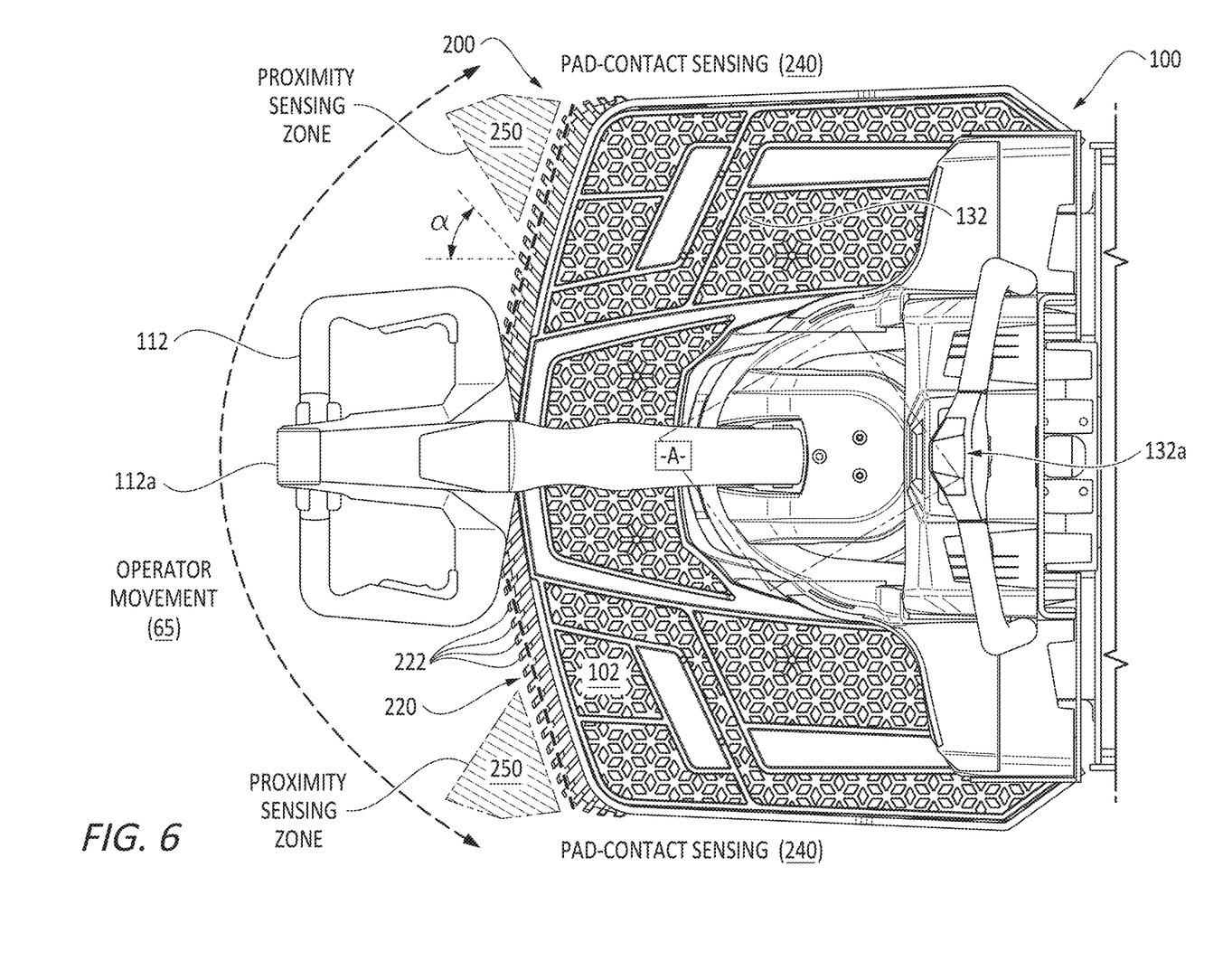
FIG. 6 is a top view of an object-sensing bumper extension arranged on a lift truck illustrating operating zones according to still further principles of the present inventive concepts.

Referring now additionally to FIG. 6, the object-sensing bumper extension 200 preferably provides two separate protective measures to a lift truck 100. First, the non-contact (e.g., optical) sensors (not shown) are arranged to provide a proximity sensing zone 250 (or "potential impact zone" or "impact danger zone") that is immediately in front of the bumper extension 200 but only near the sides of the truck 100. This permits the non-contact sensors to detect potential impact dangers in areas where accidental impacts are most likely to occur but prevents accidental triggering of reaction operations during normal operator movement (indicated by a dashed arrow) 65. Because efficient order-picking operations require the operator to move close to the truck 100, the potential impact zones 250 should be limited as much as possible to only the areas where imminent impact is likely unless corrective measures are taken. In addition to optical sensors, other non-contact sensors such as LIDAR, RADAR, or other suitable non-contact sensors could be used.

In addition to the protection afforded by the optical sensor proximity sensing zones 250, the foot guard (or pad) 220 provides further protection against operator injury resulting from impact with the truck 100. More specifically, in addition to the optical sensor(s), one or more impact sensors (not shown) can be provided to further detect and prevent undesirable operator contact. For example, one or more sensors can be arranged either in or in proximity with the contact pad 220 of the bumper extension 200 to create a pad contact sensing zone 240. In FIG. 6, the pad contact sensing zone 240 is indicated by the dotted line.

Figure 8:
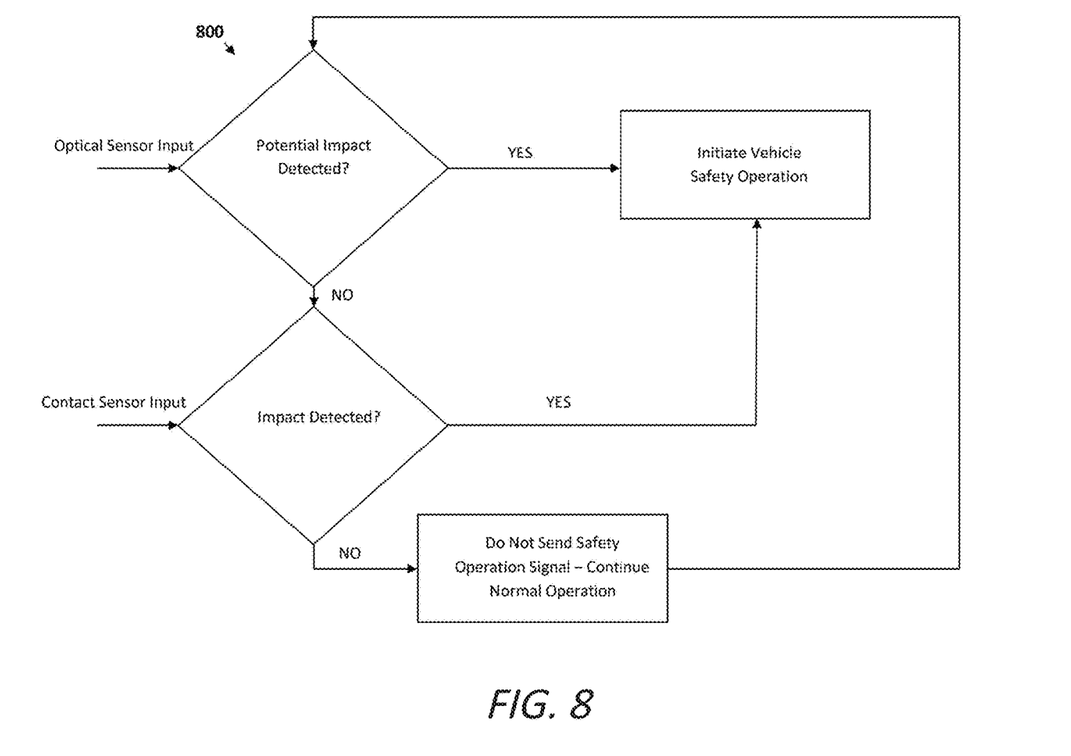
FIG. 8 is a flow chart illustrating operation of a control system of the object-sensing bumper extension according to further principles of the present inventive concepts.

In one embodiment, metallic contacts (not shown) are provided in the contact pad 220 of the bumper extension 200 such that deformation of the contact pad 220 creates contact between the metal contacts and results in an impact or deformation signal being sent to the control system 800 (see FIG. 8). As a result of the impact or deformation signal, the control system 800 can initiate a reaction operation 900 (see FIG. 9) of the vehicle 100, which may include slowing down, stopping, and/or reversing a direction of the vehicle 100 for as long as the signal is active.

Referring now to FIGS. 1A-7, during a low-level order-picking operation, an operator 60 typically operates a lift truck 100 from within an operator movement area 65 in front of the vehicle 100 using a handle 112 or other control mechanism. While operating the vehicle 100 from the front, the operator's feet 62 are at risk of being overrun or pinned by the lift truck 100. In order to prevent this, the optical sensor(s) arranged in the object-sensing bumper extension 200 preferably create a field of view 250 immediately in front of the bumper extension 200 in areas near the side of the vehicle where the operator's feet 62 are most likely to be impacted. When the field of view (potential impact zone) 250 is encroached by the operator's feet 62 (or other body parts or objects), an encroachment signal is sent to the control system 800 (see FIG. 8) and a reaction operation 900 (see FIG. 9) of the vehicle 100, 100C can be initiated. The reaction operation 900 can include, for instance, slowing down, stopping, and/or reversing direction of the vehicle 100, 100C until the interfering object is no longer in the field of view 250. By limiting the optical sensor field of view to a specific impact danger area 250 that is immediately in front of and near the sides of the bumper extension 200, the vehicle 100 can be operated without undesired slows, stops, or reversals being initiated by operator 60 (or other object) detections in non-threatening areas, such as areas of normal operator movement 65.

Figure 7:
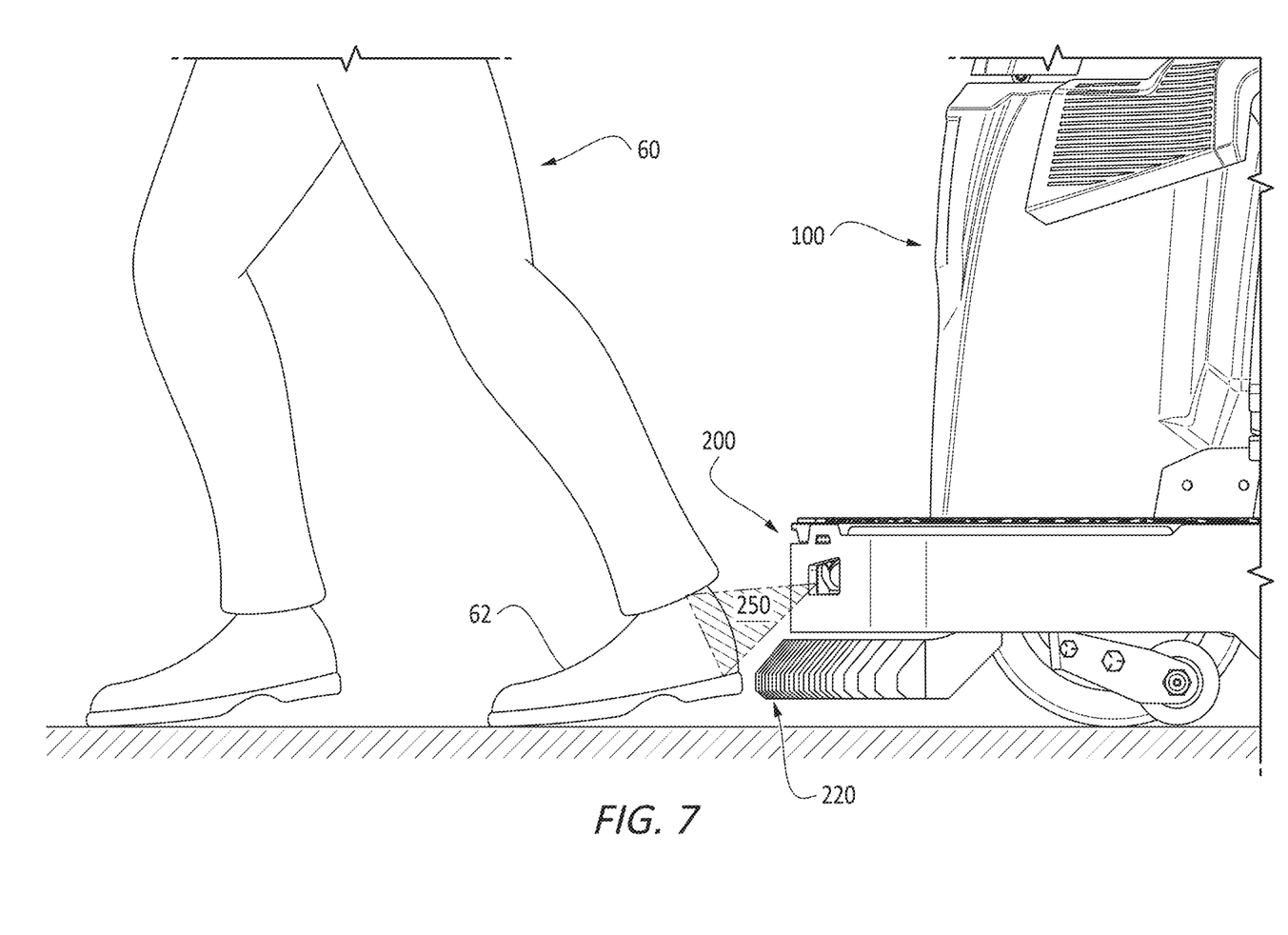
FIG. 7 is a side-view drawing illustrating an operator within a potential impact zone of the object-sensing bumper extension according to further principles of the present inventive concepts.

The physical configuration of the bumper extension 200 can further contribute to lessening impact severity to an operator 60. In the depicted embodiment, the outwardly angled, substantially parallel ridges 222 of the foot guard 220 can create an outwardly directed force upon impact with an operator's foot 62 (or other object) that pushes the foot 62 (or object) outwardly away from the vehicle 100, 100C and danger. The outward angle α can, for instance, be approximately about 30-45 degrees (or another desired angle). Upon deformation resulting from impact, the contact pad 220 of the bumper extension 200 is preferably further configured to deform downwardly to further fill an area between the vehicle 100, 100C and the ground 70 (i.e., a gap or space) and thereby further protect an operator's foot 62 (or other body part or object) from being overrun or pinned below the vehicle 100, 100C.

Figure 9:
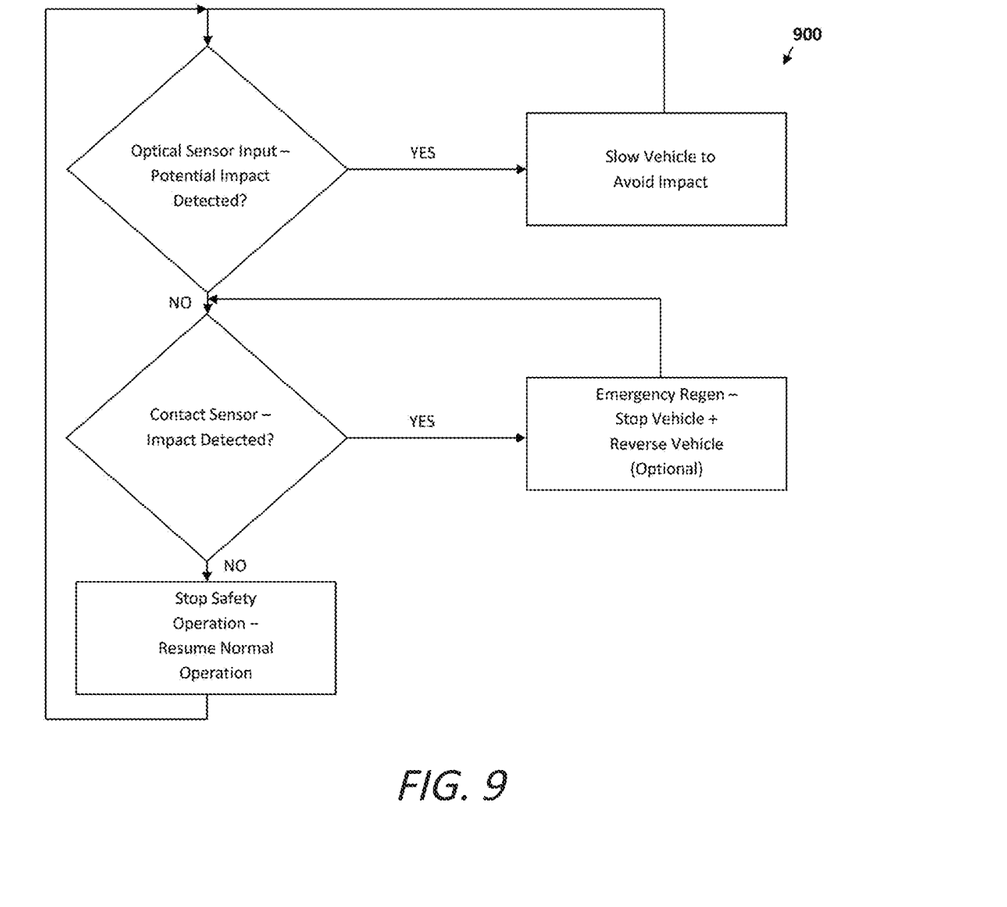
FIG. 9 is a flow chart illustrating a reaction operation of a lift truck according to still other principles of the present inventive concepts.

FIGS. 8 and 9 provide flow charts for the operation of a control system 800 and a reaction operation 900 of the vehicle using the object-sensing bumper extension 200. As illustrated in FIG. 8, a control system 800 receives input signals from the various optical and contact sensors to determine when to initiate a reaction operation 900 of the vehicle. As illustrated in FIG. 9, the reaction operation 900 of the vehicle can include various different operations depending on the signal input and the desired response. The desired reaction operation 900 can include, for example, slowing down the vehicle by a desired amount, for instance, by applying an appropriate amount of braking, stopping the vehicle entirely, and/or reversing a direction of the vehicle. Other reaction operations, such as turning or steering the vehicle away from the danger, may also be provided. The reaction operation is preferably carried out until the danger-indicating sensor inputs are no longer active. In addition to the reaction operation being performed, an audible (such as an alarm or horn) and/or visible alert (such as "Emergency Bumper" fault on touch display) can be provided to indicate the triggering of the reaction operation. Although certain responses are indicated for certain sensor inputs, any desired reaction operation, or any desired combination of reaction operations, could be triggered based on any or all independent sensor inputs or combinations of sensor inputs. For instance, in a simplified embodiment, all sensor inputs could trigger the same vehicle regen that is already provided by the belly switch to slow the vehicle. Impact or proximity detection could both result in regening to a stop, then reversing direction (for a desired limited distance) until the system is no longer triggered.

Lift trucks 100 may also permit ride-along operation by an operator standing on the foot plate 102 using the operator controls 132a arranged on handle 132. While the present inventive concepts are primarily directed toward a walk-along mode, the sensors provided herein can add additional reaction operations to a truck 100 being operated in a ride-along mode, if desired. Additional sensors such as weight or load sensors could also be provided and used to determine an appropriate reaction operation for the vehicle. For instance, weight or load sensors could be used to determine an appropriate sensor detection distance, an appropriate braking distance, and appropriate amount of braking over time, an appropriate acceleration and speed for a reverse direction of the vehicle, or other suitable operations.

CONCLUSION

Various other improvements are also contemplated and numerous variations to the specific designs identified above are possible without departing from the spirit and scope of the inventive concepts. Having described and illustrated principles of the present inventive concepts in various preferred embodiments thereof, it should be apparent that the invention can be modified in arrangement and detail without departing from such principles. In particular, it should be apparent that the fittings described herein could be used for vehicles other than lift trucks and for other moving devices. In addition, it should be apparent that different materials could be used depending on the desired flexibility and durability requirements.

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. An object-sensing bumper extension for a lift truck, the object-sensing bumper extension comprising:

a bumper extension configured to physically connect to a bumper of the lift truck;

a non-contact sensor arranged to detect an encroachment within an impact danger zone immediately in front of the bumper extension by an operator of the lift truck and to send an encroachment signal to a control system in response to the encroachment; and a contact sensor configured to detect a physical impact with the bumper extension and to send an impact signal to the control system in response to the physical impact, wherein the control system is configured to initiate a reaction operation of the lift truck in response to the encroachment signal, the impact signal, or both, and wherein the reaction operation comprises one or more of braking the lift truck and reversing a direction of travel of the lift truck.

2. An object-sensing bumper extension according to claim 1, wherein the non-contact sensor comprises an optical sensor and wherein the impact danger zone comprises an area near a side of the front of the lift truck, but not directly in front of a center of the lift truck.

3. An object-sensing bumper extension according to claim 1, wherein the contact sensor is configured to detect a physical deformation of the bumper extension.

4. An object-sensing bumper extension according to claim 1, wherein the bumper extension comprises a plurality of outwardly angled, substantially parallel ridges.

5. An object-sensing bumper extension according to claim 4, wherein the ridges are configured to deform outwardly in response to impact with the operator and provide an outwardly directed force against the impacting operator.

6. An object-sensing bumper extension according to claim 5, wherein the ridges are further configured to deform downwardly to at least partially occupy a space between the lift truck and the ground to help prevent overrunning of the impacting operator by the lift truck.

7. An object-sensing bumper extension according to claim 1, wherein the reaction operation continues until the encroachment signal and impact signal are both inactive.

8. An object-sensing bumper extension according to claim 1, wherein the bumper extension is formed from a durable yet flexible material.

9. An object-sensing bumper extension according to claim 8, wherein the material comprises Shore 60a rubber or plastic.

10. An object-sensing bumper extension according to claim 8, wherein the bumper extension is injection molded and includes metallic features that can provide impact sensors.

11. An object-sensing bumper extension for a lift truck that can be operated in a walk-along mode, said bumper extension comprising:

a bumper extension body formed from a durable yet flexible material, said bumper extension body configured to be connectable to a bumper of the lift truck that can be operated in the walk-along mode;

a non-contact sensor arranged in an opening of the bumper extension body and configured to detect encroachment within an impact danger area that is located immediately in front of and near the sides of the bumper extension body while the lift truck is operated in the walk-along mode; and an impact detection sensor configured to detect a physical impact with the bumper extension body when the lift truck is operated in the walk-along mode.

12. An object-sensing bumper extension according to claim 11, wherein the non-contact sensor comprises one or more optical sensors configured to send an encroachment signal to a control system and wherein the impact detection sensor is configured to send an impact signal to the control system, and wherein the control system is configured to initiate a reaction operation of a connected lift truck in response to either the encroachment signal or the impact signal, or both, and where the reaction operation comprises one or more of a braking operation and a reversing operation.

13. An object-sensing bumper extension according to claim 11, wherein the bumper extension body is injection molded with a plurality of metallic contacts that provide one or more impact sensors.

14. An object-sensing bumper extension according to claim 11, wherein the bumper extension body comprises a plurality of outwardly angled, substantially parallel ridges.

15. An object-sensing bumper extension according to claim 14, wherein the ridges are configured to deform outwardly and downwardly in response to an impact with an object to both provide an outwardly directed force to the object and to at least partially fill a space between the lift truck and the ground to help prevent the lift truck from overrunning the object.

16. A method of performing a reaction operation of a lift truck operated in a coast control mode, said method comprising:

operating the lift truck in the coast control mode;

receiving an encroachment signal from a non-contact sensor in response to encroachment by an operator of the lift truck within an impact danger area of the lift truck;

receiving an impact signal from an impact sensor in response to an impact between the lift truck and the operator of the lift truck; and initiating a reaction operation of the lift truck in response to either the encroachment signal, the impact signal, or both, wherein the reaction operation comprises one or more of braking the lift truck and reversing the lift truck.

17. A method according to claim 16, wherein the reaction operation includes slowing the lift truck down by braking the lift truck.

18. A method according to claim 17, wherein the reaction operation further includes stopping the lift truck by braking the lift truck.

19. A method according to claim 18, wherein the reaction operation further includes reversing a direction of travel of the lift truck by first braking the lift truck until it stops and then operating the lift truck in reverse.

20. A method according to claim 16, wherein the reaction operation is continued until the encroachment signal and the impact signal are both inactive.

* * * * *

UNITED STATES PATENT AND TRADEMARK OFFICE
CERTIFICATE OF CORRECTION

| | |
|---|---|
| PATENT NO. | : 12,065,094 B2 |
| APPLICATION NO. | : 17/581112 |
| DATED | : August 20, 2024 |
| INVENTOR(S) | : Dendy et al. |

It is certified that error appears in the above-identified patent and that said Letters Patent is hereby corrected as shown below:

In the Specification

In Column 8, Line 32, delete "and appropriate" and insert --an appropriate-- therefor.

Signed and Sealed this
First Day of October, 2024

Katherine Kelly Vidal
*Director of the United States Patent and Trademark Office*